July 2, 1968   I. F. ANDERSON   3,390,461
GUIDES
Filed May 27, 1966
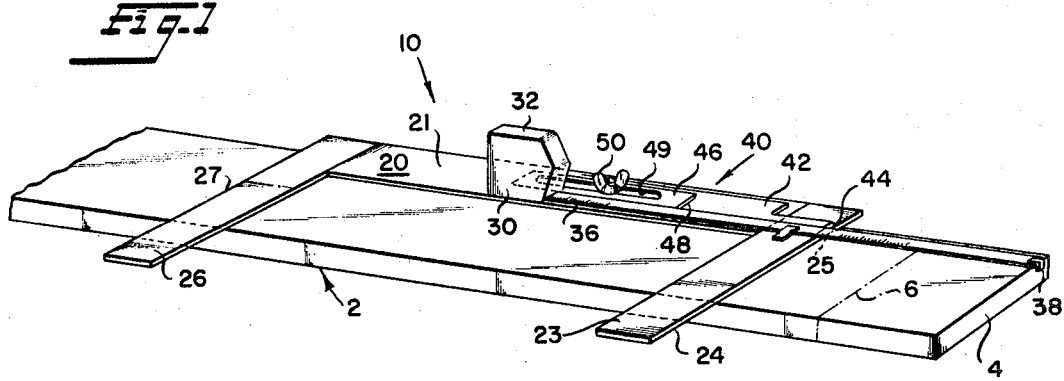
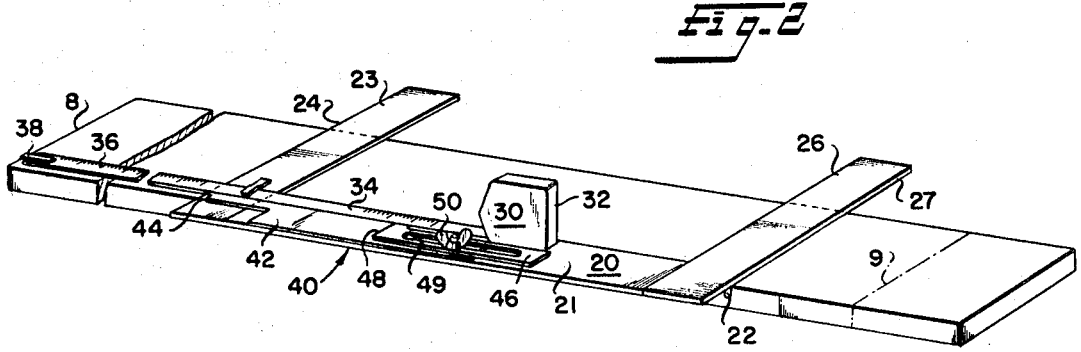
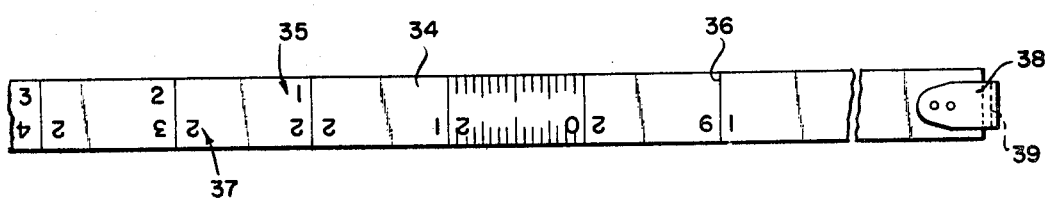
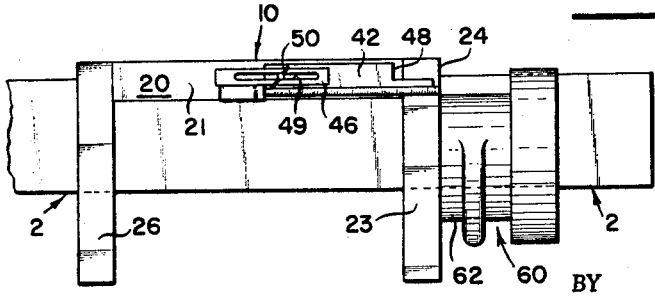
INVENTOR
Irvin F. Anderson
BY James C. Wray
ATTORNEY

United States Patent Office 3,390,461
Patented July 2, 1968

3,390,461
GUIDES
Irvin F. Anderson, 4830 N. 24th Road,
Arlington, Va. 22207
Filed May 27, 1966, Ser. No. 553,368
4 Claims. (Cl. 33—75)

ABSTRACT OF THE DISCLOSURE

Power saw guides having a workpiece aligning portion, and opposite saw guide portions, and an extensible scale with dual graduations beginning at separate points for measuring the distance between an end of a board and imaginary lines spaced from said guides a distance equal to the distance from an edge of a saw base to the blade for cutting off boards using a single combined measuring and guide placing step are described herein.

---

This invention concerns portable guides for operating upon work pieces. More particularly, this invention concerns tool guides which may be accurately positioned upon work pieces with minimum steps. Disclosed herein are guides intended for use with power saws.

The cutting of lumber to desired lengths has occupied carpenters' time since man first assembled materials for their homes. History has recorded excellent improvements in apparatus used to saw wood, from early crude saws to the modern electric saws which are part of every skilled carpenter's tools. However, time consuming preliminary steps have remained unchanged through the years. Measuring, marking, squaring and drawing a line prevails although other processes become modernized for more economical uses of time.

Many devices have been proposed as guides for use with power saws, and often these guides eliminate the need for drawing a line along the intended kerf or cut of the saw. Some examples of these guides are shown in Wilson Patent 3,171,451, Hammers Patent 2,822,834, and MacDonald Patent 2,661,034. All of these devices require several preliminary steps. Hammers, for example, requires further alignment of a pointer with the intended cutting line.

This invention eliminates all of the time consuming steps heretofore necessary in preparing lumber for sawing and replaces those steps with a single measuring step. Instead of reaching in his pocket for a rule, reaching behind his ear for a pencil, marking the wood, replacing the pencil, placing a square, reaching again for the pencil, drawing a line along the square, replacing the pencil, returning the pencil and then the square, and finally raising a saw into position before cutting—a carpenter using the guide disclosed herein need only measure the work piece, lift a separate saw into place and begin cutting.

The particular carpenter's guide disclosed in the following specification is double sided, and the scale is graduated so that either side may be used in cutting boards. When the amount to be removed from a board is known, one set of graduations and the associated index and guide portion are used. When the required length of the board is known, the guide is reversed, and the other set of graduations and its associated index and guide portion are employed.

One objective of this invention is the provision of guides having scales for extension from bodies of the guides.

Providing tool guides having aligning portions, guiding portions and scales extensible from the guides is another objective of this invention.

This invention has a further objective the provision of guides with extensible scales which are graduated to include predetermined offset of an operating point.

A further objective of this invention is the provision of a guide having a scale extensible therefrom and index means associated with the scale and adjustable on the guide to vary a predetermined offset.

Another objective of the invention is the provision of double sided measuring guides which may be used with respect to either end of a work piece.

Further objectives of the invention are apparent from the example described in the following specification and from the drawings, in which:

FIGURE 1 is a perspective view of the guide placed upon a board when measuring the amount to be removed;

FIGURE 2 is a perspective view of the guide, which has been reversed for measuring the desired length of the finished board;

FIGURE 3 is a detail of the scale used on the guide;

FIGURE 4 illustrates use of the guide with a portable power saw.

Referring to FIGURES 1 and 2, a work piece or board is generally indicated by the numeral 2; 10 generally designates the guide. Guide 10 has a body 20 which comprises a center work piece aligning portion 21 and opposite guide portions 23 and 26. In FIGURE 2, dependent aligning ridge 22 is revealed beneath guide 10. Outer faces 24 and 27 serve as guide surfaces for tools.

Scale 30 has housing 32 fixed to center portion 21 of guide body 20. A coiled steel rule 34 having graduations 36 extends in one direction from scale housing 32 to face 24 of guide portion 23. A recess 25 in guide surface 24 receives the bent tab 38 and hook 39 at the end of rule 34, when scale 30 is in its retracted position.

Indices 40 consist of plates 42 and 46 which are reciprocally mounted on the guide. Edges 44 and 48 of plates 42 and 46 are indices which are associated with scale 30. Thumb screw 50, slot 49, and a similar slot in plate 42 cooperate for zero adjustment of the indices. Such adjustment is necessary, however, only when tools of varying width are used.

Eccentrics may be mounted in guide body 20 adjacent the junctions of aligning portion 21 with guide portions 23 and 26. Turning the eccentrics slightly varies the right angles between the body portions to compensate for saws having slightly misaligned bases.

FIGURE 3 illustrates the detail of rule 34. Graduations 36 appear in separate groups 35 and 37 along upper and lower edges of the scale. Graduations 35 are used with index 44; graduations 37 are associated with index 48. All graduations indicate distances between the inside of hook 39 on tab 38 and zero reference points, which are related to guide 10 and its guide surfaces 24 and 27.

As shown in FIGURE 4, the illustrated example of the guide is intended for use with a power saw 60. Saw 60 is mounted on a platform 62 perpendicular to the guarded saw blade. The blade is a known distance, usually five inches, from the remote edge of the platform. Scale 30 accounts for the width of platform 62 so that the saw's kerf is at the zero reference point of the scale.

When the amount to be removed from a board is known, tab 38 is placed over end 4 of board 2, and guide 10 is moved along the board until that amount is indicated on graduations 35 and opposite index 44. Guide 10 is held in position while tab 38 is lifted, and scale 30 is automatically retracted until tab 38 homes in depression 25. The edge of saw's platform 62 is run along guide surface 24, and board 2 is cut at kerf 6.

When the desired length of a board is known, guide 10 is reversed, as shown in FIGURE 2. Tab 38 is attached to the other end 8 of board 2; graduations 37 are read at index 48; and surface 27 is used as a saw guide. Kerf 9 is produced by the saw blade, and the board is cut to the desired length, which is read directly on the scale. In both cases, as soon as the measuring step is completed, the article is ready to be cut. No further steps are required. Thus, a great saving in time and a reduction of possibilities for mistakes are realized.

Although the invention has been described by one specific embodiment, it will be obvious to one skilled in the art that many variations may be made without departing from the invention. The specific scope of the invention is precisely defined only in the appended claims.

I claim:
1. A guide comprising:
   a body having a work piece aligning portion and opposite guide portions,
   a scale mounted on said body for extension therefrom, said scale having a free end and first and second series of sequentially numbered graduations beginning at separated points, and
   at least one index means mounted on said body and associated with the sequentially numbered graduations of said scale at a point spaced from a beginning of the graduations for positioning at least one of said guide portions accurately with respect to a work piece.
2. Apparatus of claim 1 wherein said at least one index means comprises two indices respectively associated with said opposite guide portions and with said first and second series of graduations on said scale.
3. Apparatus of claim 2 wherein said two indices are independently adjustable with respect to said body, and with respect to said opposite guide portions and to said first and second series of graduations of said scale.
4. Apparatus of claim 1 wherein said body comprises spaced first and second guide portions, wherein said scale defines first and second series of graduations, and wherein said at least one index means comprises first and second indices respectively associated with said first and second series of graduations for measuring distances from one end of the work piece to an imaginary point offset from said first guide portion and for measuring distance from one other end of the work piece to an imaginary point offset from said second guide portion.

References Cited
UNITED STATES PATENTS

| | | | |
|---|---|---|---|
| 530,111 | 12/1894 | Krebs | 33—112 |
| 2,801,472 | 8/1957 | Davidiak et al. | 33—143 |
| 3,242,580 | 3/1966 | Crawford | 143—6.43 |
| 3,309,775 | 3/1967 | Vieregge | 33—103 |

FOREIGN PATENTS

| | | |
|---|---|---|
| 478,074 | 10/1951 | Canada. |
| 327,773 | 3/1958 | Switzerland. |

HARRY N. HAROIAN, *Primary Examiner.*